No. 782,321.

Patented February 14, 1905.

UNITED STATES PATENT OFFICE.

WILLIAM BROTHERS, OF PRESTWICH, ENGLAND.

MANUFACTURE OF CRYSTALLINE GYPSUM APPLICABLE FOR FILLING PURPOSES.

SPECIFICATION forming part of Letters Patent No. 782,321, dated February 14, 1905.

Application filed February 29, 1904. Serial No. 195,929.

*To all whom it may concern:*

Be it known that I, WILLIAM BROTHERS, a British subject, and a resident of Prestwich, in the county of Lancaster, England, have invented certain new and useful Improvements in the Manufacture of Crystalline Gypsum Applicable for Filling Purposes, of which the following is a specification.

This invention relates to the manufacture or preparation of calcium sulfate or gypsum, known as "pearl hardening," "crystal hardening," or "satin finish," (or under other names) employed as a filling for paper and textile fabrics and for other purposes. Hitherto such material has been prepared by chemical precipitation from a soluble chlorid by a sulfate or sulfuric-acid solution, giving a crystalline precipitate, or natural gypsum has been finely ground for the same purpose.

The invention consists, essentially, in treating calcium sulfate (either in the natural form of gypsum or in the powdered form of a chemical by-product or other form) in water or in an aqueous solution at a temperature between 176° and 260° Fahrenheit (or 80° and 130° centigrade) or upward and then agitating while cooling to keep the crystals apart while forming and permit each crystal to form separately.

In carrying out the invention the natural gypsum or other calcium sulfate is reduced to a fine state of subdivision and is mixed with water to a thick milky or creamy consistency and is placed in a boiler, pan, or vat of a closed type to which heat can be applied to raise it under pressure to a temperature of preferably 250° Fahrenheit (120° centigrade) or upward, or the gypsum is broken into lumps and placed in a vat or pan of a closed type containing water, to which heat is applied to raise it under pressure to a temperature of 250° Fahrenheit (120° centigrade) or upward. In one method steam is admitted to or passed through the mixture until it is raised to the required temperature—say about 250° Fahrenheit (or 120° centigrade)—at a pressure of about five pounds to twenty pounds per square inch. In another method steam may be applied to a jacket or steam-chamber surrounding the closed pan at a pressure to raise it to the desired temperature; or the closed boiler, pan, or vat may be raised to the desired temperature by the direct action of a flame or heated gases from coal, coke, gas, or other fuel, the pressure in the pan in each case being maintained at a degree of from five pounds to twenty pounds per square inch to obtain the desired temperature in the liquor of from 176° to 260° Fahrenheit, (80° to 130° centigrade.) In the case of natural gypsum being treated when the requisite temperature of about 250° Fahrenheit (or 120° centigrade) is reached the gypsum first parts with part of its water of crystallization and re-forms as the hydrate of calcium sulfate, $2(CaSO_4)H_2O$. In the case of non-crystalline calcium sulfate when the temperature of about 250° Fahrenheit (or 120° centigrade) is reached it crystallizes into needle-like crystals of the hydrate $2(CaSO_4)H_2O$. The mixture is then somewhat violently agitated and the agitation continued during the process of cooling, and as it cools the hydrate crystals again change, taking up water and finally recrystallizing and are precipitated in separate needle crystals as gypsum, $CaSO_4.2H_2O$. The cooling may take place naturally by withdrawing the heat, or the cooling may be done quickly by injecting cold water into the mass or by pouring the mass out into cold water, the agitation being continued all the time to keep the crystals apart and prevent them setting together as they re-form and enable each crystal to form separately as they take up the whole amount of water of crystallization. The crystals so formed are removed and dried. The resulting product is a loose crystalline mass of $CaSO_4.2H_2O$, useful as a filling material or for other purposes. The loose crystalline material may be ground to break down the crystals to any degree of fineness.

What I claim as my invention, and desire to protect by Letters Patent, is—

1. The process of preparing a loose crystalline mass of calcium sulfate ($CaSO_4.2H_2O$) known as pearl hardening, satin finish, crystal finish or by other name, from calcium sulfate comprising the cooking or boiling of such calcium sulfate in the presence of water, cooling the crystals so formed before removing the water and agitating the mass during the process of cooling to cause such crystals to form or precipitate separately, and subsequently removing the water and drying them substantially as described.

2. The process of preparing a loose crystalline mass of calcium sulfate ($CaSO_4.2H_2O$) known as pearl hardening, satin finish, crystal finish or by other name, from calcium sulfate comprising the cooking or boiling of such calcium sulfate in an aqueous solution cooling the crystals so formed before removing the water and agitating the mass during the process of cooling to cause such crystals to form or precipitate separately, and subsequently removing the water and drying them substantially as described.

3. The process of preparing a loose crystalline mass of calcium sulfate ($CaSO_4.2H_2O$) known as pearl hardening, satin finish, crystal finish, or by other name which consists in cooking or boiling gypsum or other calcium sulfate in water at a temperature between 176° and 260° Fahrenheit to form hydrate crystals $2(CaSO_4)H_2O$ cooling the said crystals in the water, agitating the crystals while they recrystallize as hydrated crystals $CaSO_4.2H_2O$ to cause them to precipitate into loose separate crystals and subsequently removing the water and drying them substantially as described.

4. The process of preparing a loose crystalline mass of calcium sulfate ($CaSO_4.2H_2O$) known as pearl hardening, satin finish, crystal finish, or by other name which consists in cooking or boiling gypsum or other calcium sulfate in an aqueous solution at a temperature between 176° and 260° Fahrenheit to form hydrate crystals $2(CaSO_4)H_2O$ cooling the said crystals in the water, agitating the crystals while they recrystallize as hydrated crystals $CaSO_4.2H_2O$ to cause them to precipitate into loose separate crystals and subsequently removing the water and drying them substantially as described.

In witness whereof I have hereunto signed my name in the presence of two subscribing witnesses.

WILLIAM BROTHERS.

Witnesses:
J. OWDEN O'BRIEN,
B. TATHAM WOODHEAD.